US006959667B2

(12) United States Patent
Bordelon

(10) Patent No.: US 6,959,667 B2
(45) Date of Patent: Nov. 1, 2005

(54) ANIMAL NAIL TRIMMER

(75) Inventor: Lisa Bordelon, St. Petersburg, FL (US)

(73) Assignee: Rocket Pocket Pets, Inc., St. Petersburg, FL (US)

( * ) Notice: Subject to any disclaimer, the term of this patent is extended or adjusted under 35 U.S.C. 154(b) by 0 days.

(21) Appl. No.: 10/909,452

(22) Filed: Aug. 2, 2004

(65) Prior Publication Data

US 2005/0087145 A1 Apr. 28, 2005

Related U.S. Application Data

(60) Provisional application No. 60/514,777, filed on Oct. 27, 2003.

(51) Int. Cl.[7] .............................................. A01K 13/00

(52) U.S. Cl. ...................................................... 119/610

(58) Field of Search ........................ 119/600, 608, 610, 119/609, 700

(56) References Cited

U.S. PATENT DOCUMENTS

| | | | | |
|---|---|---|---|---|
| 2,076,734 A * | 4/1937 | Leindorf | ..................... | 119/468 |
| 5,588,397 A * | 12/1996 | Johnakin, III | ............... | 119/468 |
| 5,730,084 A * | 3/1998 | Kacic | ......................... | 119/165 |
| 6,332,431 B1 * | 12/2001 | Brown | ....................... | 119/600 |
| 6,619,236 B1 * | 9/2003 | Johnakin, III | ............... | 119/468 |
| 6,698,384 B2 * | 3/2004 | Markowitz | .................. | 119/473 |

* cited by examiner

*Primary Examiner*—T. Nguyen
(74) *Attorney, Agent, or Firm*—Gifford, Krass, Groh, Sprinkle, Anderson & Citkowski

(57) ABSTRACT

A nail trimming device for pets and small animals includes a base member and a spacer member. The base member has an abrasive top surface. The spacer member is in the form of a grid having a plurality of apertures. The spacer member is placed over the grid so that when the animal moves across the spacer member its paws are supported on the top surface of the spacer while the nails extend through to contact the abrasive surface and the nails of the animal are trimmed. The spacer member and base may be mounted to a running wheel or the like.

6 Claims, 3 Drawing Sheets

ANIMAL NAIL TRIMMER

RELATED APPLICATION

This application claims priority of U.S. Provisional Patent Application Ser. No. 60/514,777 filed Oct. 27, 2003, which is incorporated herein by reference.

BACKGROUND OF THE INVENTION

It is desirable to trim the nails of pets and other small animals which are kept indoors. Trimming of the nails is important to prevent the nails from being caught on cages and other accessories which may cause injury. In some instances an animal's nails can grow so long that the nails will curl inwardly and grow back into the foot of the animal. In these cases the animal can develop infections and will suffer pain and difficultly in walking and maneuvering.

Nail trimming devices such as clippers or scissors are typically used to trim the animal's nails. However, it is difficult to use such a device on small animals which have nails which are so small that they are hard to see. As a result, the nails of small animals are sometimes over trimmed causing bleeding or other possible discomfort to the animal. Accordingly, it would be desirable to provide a device which would effectively trim the nails of small animals such as sugar gliders without providing discomfort to the animal.

SUMMARY OF THE INVENTION

Accordingly, a novel trimming device for shortening the length of the nails of an animal includes a base having an abrasive top surface and a spacer member positioned on the abrasive surface of the base. The spacer member has a top surface for supporting the paws of the animal. A plurality of apertures pass through the spacer and contact the abrasive surface of the base. The trimming device may be attached to an inner surface of a running wheel or the like so that the animal's nails are trimmed as the animal uses the running wheel.

BRIEF DESCRIPTION OF THE DRAWINGS

An embodiment of the invention shall now be described in detail by way of example with reference to the accompanying drawings, wherein.

DETAILED DESCRIPTION OF THE PREFERRED EMBODIMENTS

Figure 1:
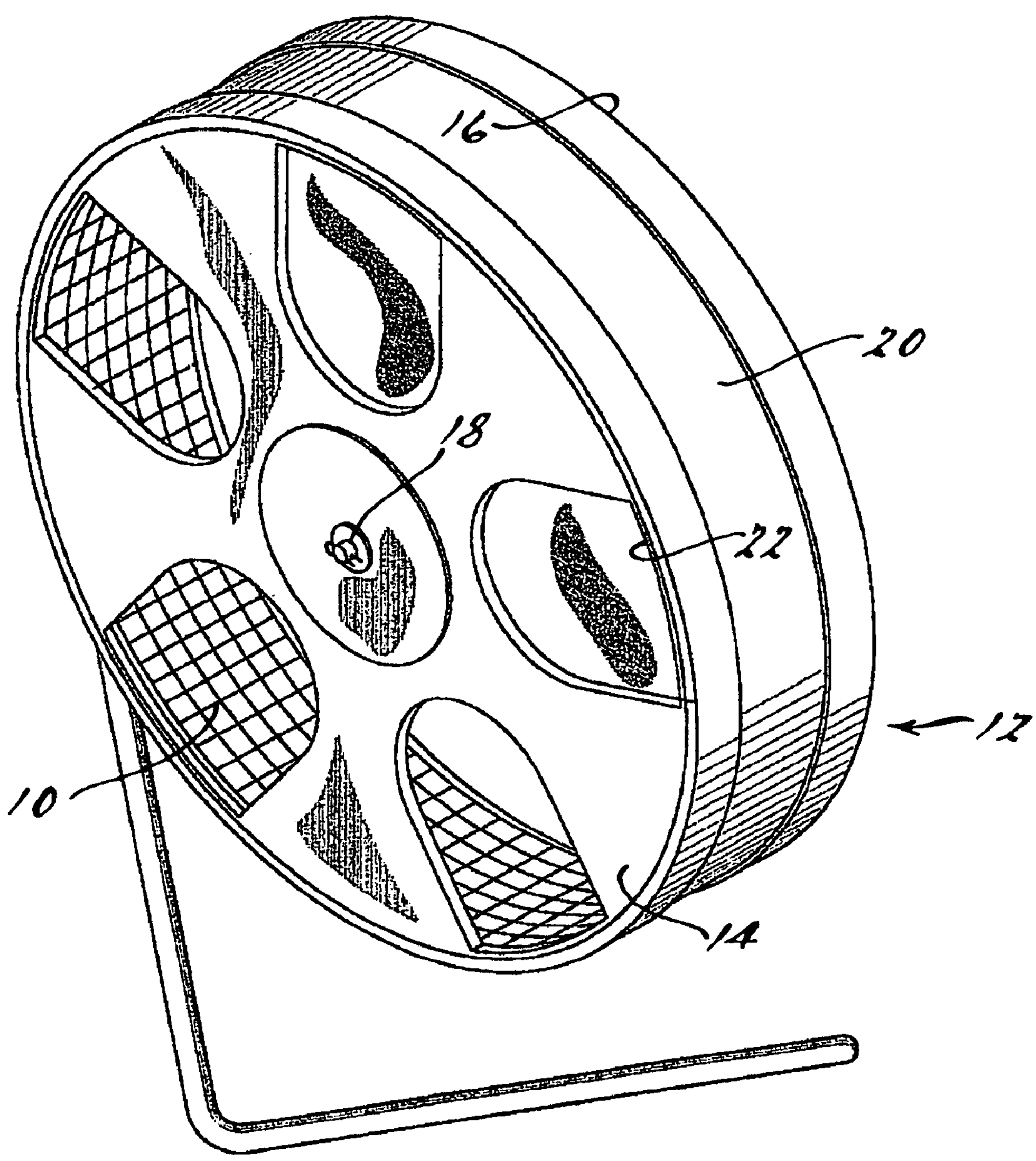
FIG. 1 is a perspective view of a running wheel having a nail trimming device in accordance with the invention.

As shown in FIG. 1, a nail trimming device 10 in accordance with the invention is useful for trimming the nails of small animals such as sugar gliders, gerbils, hamsters, flying squirrels, rats, mice, prairie dogs, guinea pigs and the like. The nail trimming device 10 is shown for use with a conventional running wheel 12. The running wheel 12 functions as an exercise device for the animal. Although shown for use with the running wheel 12, the nail trimming device 10 may be used as a floor or side for a cage or mounted on a pole on which an animal climbs. The running wheel 12 has a pair of sides 14, 16 which are spaced apart and supported on an axial pivot rod 18. Some wheels have a single side. A circumferential wall 20 extends between the sides 14, 16. The circumferential wall 20 has an inner surface 22 which is provided to support the small animal while it runs. As the animal runs, the wheel 12 spins so that the animal may run on the inner surface 22 like a treadmill.

Figure 4:
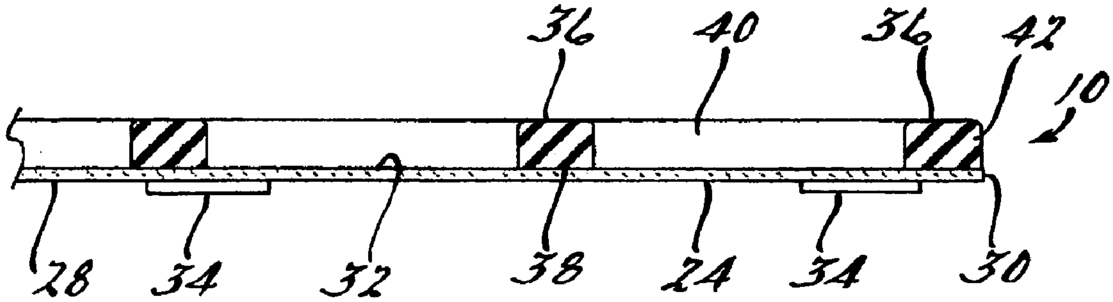
FIG. 4 is a sectional view of the spacer member in accordance with the invention.
Figure 5:
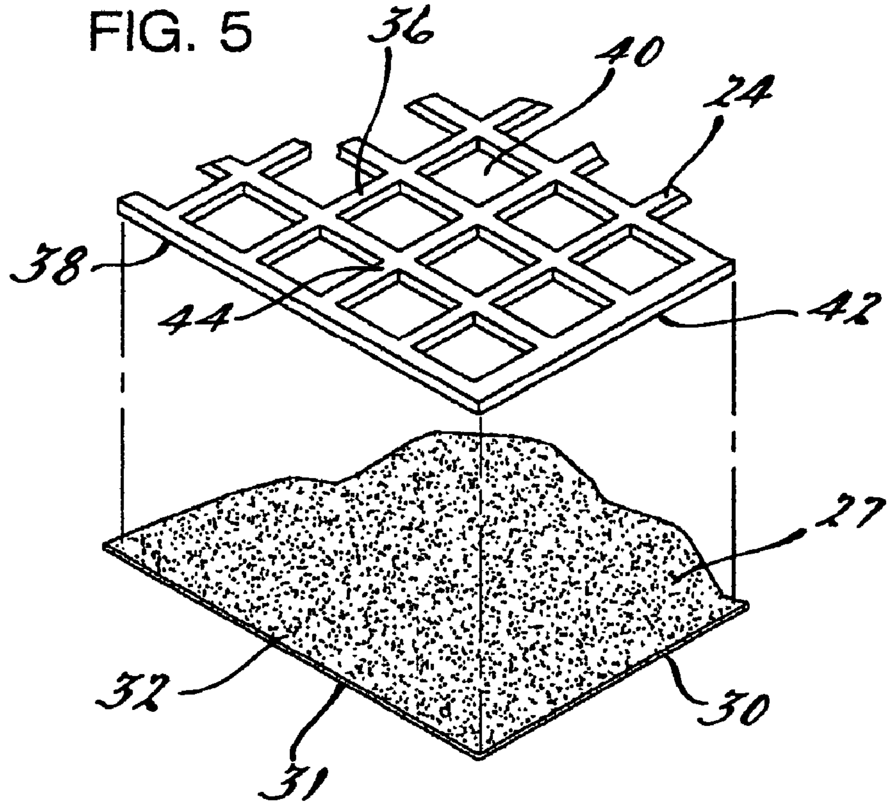
FIG. 5 is an exploded view of a base and spacer member in accordance with the invention.

As best shown in FIGS. 2–5, the nail trimming device 10 includes a base 24 and spacers 26. The base 24 is generally rectangular and formed of flexible material. The base 24 has a top surface 27, a bottom surface 28 extending between a pair of side edges 30 and a pair of ends 31. As best shown in FIG. 4, the top surface 26 has a coating 32 of abrasive material. A suitable base 24 may be formed from a strip of 320 grit wet/dry sandpaper; however, other abrasive materials may be used depending on the application. The base 24 has a length between the ends 31 equal to an inner circumference of the running wheel 12. As shown in FIG. 4, a fastener may be a non slippage strip such as adhesive strips 34 mounted to the bottom of the base 24 to prevent slippage of the device on the inner surface 22 of the running wheel 12 on the surface of the wheel. However, the device may be easily removed from the wheel to use solely as an exercise device.

Figure 2:
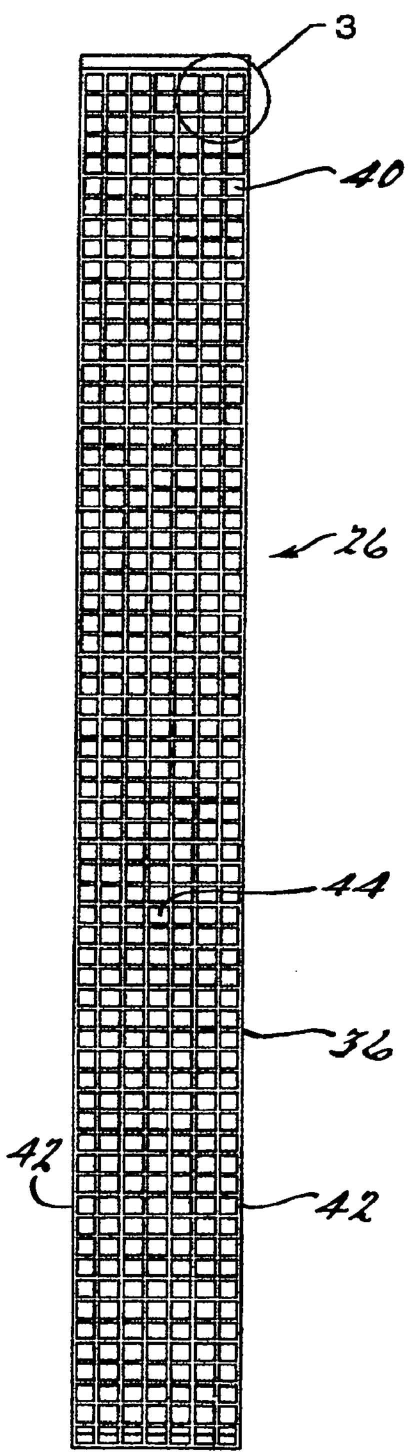
FIG. 2 is a top view of a spacer member in accordance with the invention.
Figure 3:
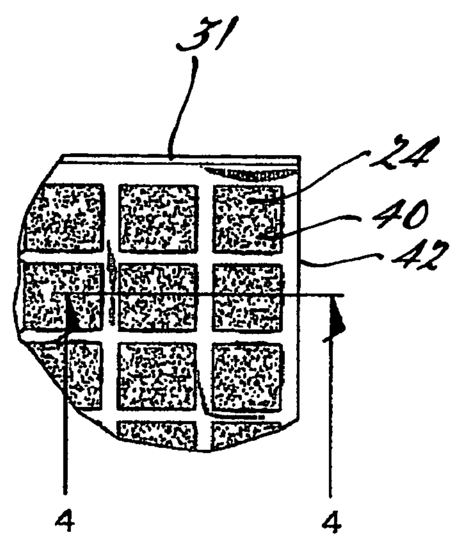
FIG. 3 is a partial view of the spacer and base in accordance with the invention.

As shown in FIG. 2, the spacer member 26 is a rectangular grid formed of plastic such as polyethylene. The spacer member 26 has an upper surface 36 upon which the animal's paws rest during use and a lower surface 38 which is in abutment with the top surface 26 of the base. The spacer 24 has a predetermined thickness such as one-eighth of an inch, which is roughly equivalent to the length to which the animal's nails are to be trimmed. The grid is lattice-like having apertures 40 through which the animal's nails extend to contact the top surface 26 of the base 24. The spacer 26 has a width between edges 42 which is generally the same as the base 24. The length of the spacer is shorter than that of the base 24 because the circumference is less.

When used with a running wheel, the bottom surface 28 of the base is positioned on the inner surfaces of the running wheel 22. The spacer is laid over the top surface of the base in a circle. Once installed the animal uses the running wheel as before, however the paws of the animal rest on the top surface of the spacer while the nails of the animal extend through the apertures of the spacer to contact the abrasive surface of the base to trim the nails of the animal. Although shown for use with running wheels, the nail trimming device 10 may be used with other types of devices such as cages or climbing poles. When used in a cage, it is mounted in the animal's cage so that as the animal walks or climbs across the device to trim its nails. Likewise, the device may be mounted around the circumference of a pole which an animal climbs so that the animal trims its nails as it climbs up the pole.

Having described my invention with the preferred embodiment discussed above, it is clear that other aspects, objects and advantages of the invention can be obtained from a study of the drawings, disclosure and the appended claims.

What is claimed is:

1. A device for shortening the length of nails of an animal, said device mounted to a running wheel, said running wheel having a circumferential inner surface, said device comprising:

a base having an abrasive surface and an opposed bottom surface, said bottom surface mounted to said inner surface; and a spacer member having a support surface spaced a predetermined distance from the abrasive surface of the base, said base and said spacer member forming a ring inside said wheel, said spacer further having a plurality of openings extending through the spacer member and being adapted to permit the paws of the animal to rest on the support surface while the nails of the animal extend through one or more of the plurality of openings to contact the abrasive surface thereby shortening the length of the nails.

2. The device of claim 1 further comprising a fastener for fastening the device to a cage.

3. The device of claim 1 wherein the base has a predetermined width generally equal to a predetermined width of the spacer member.

4. The device of claim 1 wherein the spacer member has a bottom surface which abuts the abrasive surface of the base.

5. The device of claim 1 wherein the base member is planar and has a bottom surface opposite the abrasive surface.

6. The device of claim 2 wherein the fastener is a non slippage strip mounted to the bottom surface of the base.

* * * * *